(12) United States Patent
Baghel et al.

(10) Patent No.: US 8,199,703 B2
(45) Date of Patent: Jun. 12, 2012

(54) METHOD AND SYSTEM FOR EFFICIENT CONNECTION SETUP PROCEDURE FOR MOBILE TERMINATED (MT) CALLS

(75) Inventors: Sudhir Kumar Baghel, Bangalore (IN); Tirumala Sree Hari Vara Prasad Vadlapudi, Bangalore (IN)

(73) Assignee: Samsung Electronics Co., Ltd (KR)

( * ) Notice: Subject to any disclaimer, the term of this patent is extended or adjusted under 35 U.S.C. 154(b) by 350 days.

(21) Appl. No.: 12/374,625

(22) PCT Filed: Jul. 20, 2007

(86) PCT No.: PCT/KR2007/003516
§ 371 (c)(1),
(2), (4) Date: Nov. 23, 2009

(87) PCT Pub. No.: WO2008/010686
PCT Pub. Date: Jan. 24, 2008

(65) Prior Publication Data
US 2010/0097984 A1    Apr. 22, 2010

(30) Foreign Application Priority Data
Jul. 21, 2006  (IN) ............................ 1262/CHE/2006

(51) Int. Cl.
*H04W 4/00* (2009.01)
*H04J 3/16* (2006.01)
(52) U.S. Cl. ........................ 370/328; 370/437
(58) Field of Classification Search .................... 370/328
See application file for complete search history.

(56) References Cited

U.S. PATENT DOCUMENTS

| | | | | |
|---|---|---|---|---|
| 5,841,806 A | * | 11/1998 | Gilhousen et al. | 375/146 |
| 6,674,739 B1 | | 1/2004 | Lee et al. | |
| 2003/0223417 A1 | | 12/2003 | Higashida | |
| 2003/0223427 A1 | | 12/2003 | Chang et al. | |
| 2005/0141546 A1 | | 6/2005 | Heo | |
| 2006/0018336 A1 | * | 1/2006 | Sutivong et al. | 370/437 |
| 2007/0015523 A1 | * | 1/2007 | Prakash et al. | 455/458 |

FOREIGN PATENT DOCUMENTS

| | | |
|---|---|---|
| KR | 1020030093601 A | 12/2003 |
| KR | 1020050071329 A | 7/2005 |
| KR | 1020050115680 A | 12/2005 |
| KR | 0619866 B1 | 9/2006 |
| KR | 1020070031039 A | 3/2007 |

* cited by examiner

*Primary Examiner* — Jeffrey Pwu
*Assistant Examiner* — Noel Beharry
(74) *Attorney, Agent, or Firm* — The Farrell Law Firm, P.C.

(57) ABSTRACT

The invention relates to telecommunication systems and in particular to a method and system for efficient connection setup procedure for mobile terminated calls. A method of connection setup for mobile terminated calls is proposed in which a page message originating from the access network contains one access sequence along with access terminal identity or unicast access terminal identifier (UATI) of the paged access terminal. When more than one access terminal uses the same access sequence for sending their access probe at the same time a collision may occur. Access network selects access sequences from a reserved pool to direct the paged access terminal for performing access attempt to avoid collisions during access attempts. With this resource pooling, there is no need to send bind request and hence connection setup time reduces.

8 Claims, 5 Drawing Sheets

METHOD AND SYSTEM FOR EFFICIENT CONNECTION SETUP PROCEDURE FOR MOBILE TERMINATED (MT) CALLS

PRIORITY

This application claims priority under 35 U.S.C. §119(a) to an application filed in the Indian Intellectual Property Office on Jul. 21, 2006, and assigned Serial No. 1262/CHE/2006, and under 35 U.S.C. §365(c) to PCT application PCT/KR2007/003516 filed Jul. 20, 2007, the contents of both of which are incorporated herein by reference.

BACKGROUND OF THE INVENTION

1. Field of the Invention

The present invention in general relates to a method and system for improved connection setup procedure while responding for a page (i.e. for mobile terminated calls). More particularly this invention relates to a method and system for efficient connection setup procedure for mobile terminated (MT) calls, with reduced probability of collision during access attempt.

2. Description of the Related Art

Mobile terminated Connection Setup procedure proposed for EVDO evolution system (i.e. 3GPP2 UMB) works [1] in the following manner (as shown in the FIG. 1):

1. Access Network (AN) sends Page message to an Access Terminal (AT), page message contains unique ATI of the paged AT
2. AT selects one access sequence (randomly) and sends access sequence as preamble (with power ramping procedure, if probe is not reaching to AN) Selected access sequence belongs to one of the sets, as all available access sequences are partitioned into sets based on pilot strength level and buffer requirement of the application.
3. AN sends Access Grant (AG) message once access probe is received by it. AG message has the same access sequence sent by AT. AG message may also contain timing information and resources for AT to transmit in the reverse direction. These resources are to be used for exchanging Bind Request/Response messages.
4. AT sends Bind Request (and ConnectionOpenRequest) message to AN. AT sends its unique ATI, and MAC ID (which it has received in AG message).
5. Bind Response is sent by AN to acknowledge Bind request message. Bind Request/Bind Response mechanism ensures that there is no collision during access attempt.
6. AN sends ConnectionOpenResponse message to AT (ConnectionOpenResponse message can be sent as part of Bind Response message or it can be sent as a separate message. This option is provided because MAC ID provided in the AG message expires in 100 ms, and AN may take longer time to find the session related information of AT before AN can send ConnectionOpenResponse message).

Collision During Access Attempt

Collision is a phenomenon when more than one AT uses the same Access Sequence to send their access probe at the same time. AN may detect only one of those access probes. AN will respond with an AG message containing the access sequence corresponding to the detected access probe. But this AG message may be received by more than one AT who have used the same access sequence to send the access probe. Hence all those ATs will treat the AG as a response to their access probe and will go to next step in the connection setup procedure and all of them will claim the MAC ID provided in the AG message. This is the cause of collision during access attempt. To resolve this issue Bind Request/Response mechanism is provided.

Access probe has no payload and it carries only a 10 bit random AccessSequence.

AccessGrant may contains MAC ID, Time offset (for RL OFDM waveform to be within cyclic prefix) and AccessSequence (to distinguish between multiple users who may have sent access probe at the same time).

Access probe and access grant exchange provides to the AT; Dedicated RCC (RL Control Channel) resources (for CQI reporting, REQ channel to request RL OFDM tones), Closed loop power control, Ability for RL/FL unicastdata exchange. From lower layers perspective, connection between sector and AT is established once MAC ID is assigned.

Access probe and Access grant exchange does not provide:
Knowledge of Unique ATI to the sector (Sector does not know session (QoS, security) information),
resolution of access collisions.

SUMMARY OF THE INVENTION

The present technique generally relates to telecommunication systems and in particular to a method and system for efficient connection setup procedure for mobile terminated calls.

A new connection setup mechanism in response to page message (i.e. for Mobile Terminated call) is proposed in which a page message is sent from AN containing one Access Sequence along with unique ATI of the paged AT. The Access Sequence is selected from a pool of access sequences which are reserved and can only be allocated by AN. In this way collision during Access Attempt is avoided (Also AN knows that this access procedure is in response to page as access attempt is made with the Access Sequence sent in the page message). Because of this, there is no need to send Bind Request/Response, which results in reduced connection setup time, even if it is required to send Bind Request/Response (and hence Connection Request/Response) then also sending reserved access sequence in the page message has many advantages, e.g. reduced overall collision probability, reduced access probe detection threshold at AN (this is because AN knows it has sent a page message with a particular access sequence so it is waiting for that specific access sequence hence making the detection of the probe easier.

Some of the Access Sequences can be reserved and these Access Sequences will be assigned by AN to AT in the page message along with unique ATI.

Some times it is desirable to send page messages to many ATs simultaneously in a single page packet. In this type of scenario the proposed mechanism i.e. reserving few access sequences out of available access sequences and sending one sequence per paged AT can still be applicable. Efficient usage of available bits is possible by sending one access sequence, which can be called as base access sequence and it will be applicable for the first ATI in the page packet; rest of the pegged ATs can derive their respective reserved access sequence by applying simple arithmetic of adding it's location in the page packet to the base sequence number. Further optimization is possible in the form of indexing the reserved access sequence; in this way instead of sending complete access sequence in the page packet one index can be sent which can be represented with less number of bits.

Incase of limited Access Sequences to be reserved, then the same access sequences can be reused by AN after timeout (for example: 2 super frames) period.

In another embodiment, reverse resource allocation is sent along with page which can directly be utilized to request further resources from AN. This approach can even remove the need for sending Access Probe and Access Grant exchange hence reduces the connection setup time to a good extent. FIG. 5 shows this scenario.

Accordingly this invention explains a method for efficient connection setup procedure for mobile terminated (MT) calls comprising the steps of:

reserving Access Sequences, and using the said sequences only to send in page message along with full unique ATI;

using the reserved Access Sequences by AN to direct the paged ATs to do the access attempt by using the access sequence;

sending access probe in the form of preamble using the Access Sequence by the AT;

treating access probe as ConnectionOpenRequest message when the access probe with this access sequence is received by AN and AN sends the AG message in response to access; and stopping Access attempts by AT upon reception of AG message by considering AG message as ConnectionOpenResponse.

Accordingly the invention also explains a system for efficient connection setup procedure for mobile terminated (MT) calls comprising:

means for reserving Access Sequences, and using the said sequences only to send in page message along with full unique ATI;

means for using the reserved Access Sequences by AN to direct the paged ATs to do the access attempt by using the access sequence;

means for sending access probe in the form of preamble using the Access Sequence by the AT;

means for treating access probe as ConnectionOpenRequest message when the access probe with this access sequence is received by AN and AN sends the AG message in response to access; and means for stopping Access attempts by AT upon reception of AG message by considering AG message as ConnectionOpenResponse Other objects, features, and advantages of the present invention will become more apparent from the ensuing detailed description of the invention, taken in conjunction with the accompanying drawings, which depicts the flowchart of the various stages of the methods involved.

DETAILED DESCRIPTION

The preferred embodiments of the present invention will now be explained with reference to the accompanying drawings. However, it should be understood that the disclosed embodiments are merely exemplary of the invention, which may be embodied in various forms. Therefore the details disclosed herein are not to be interpreted as limiting but merely as the basis for the claims and as a basis for teaching one skilled in the art how to make or use the invention.

Figure 2:
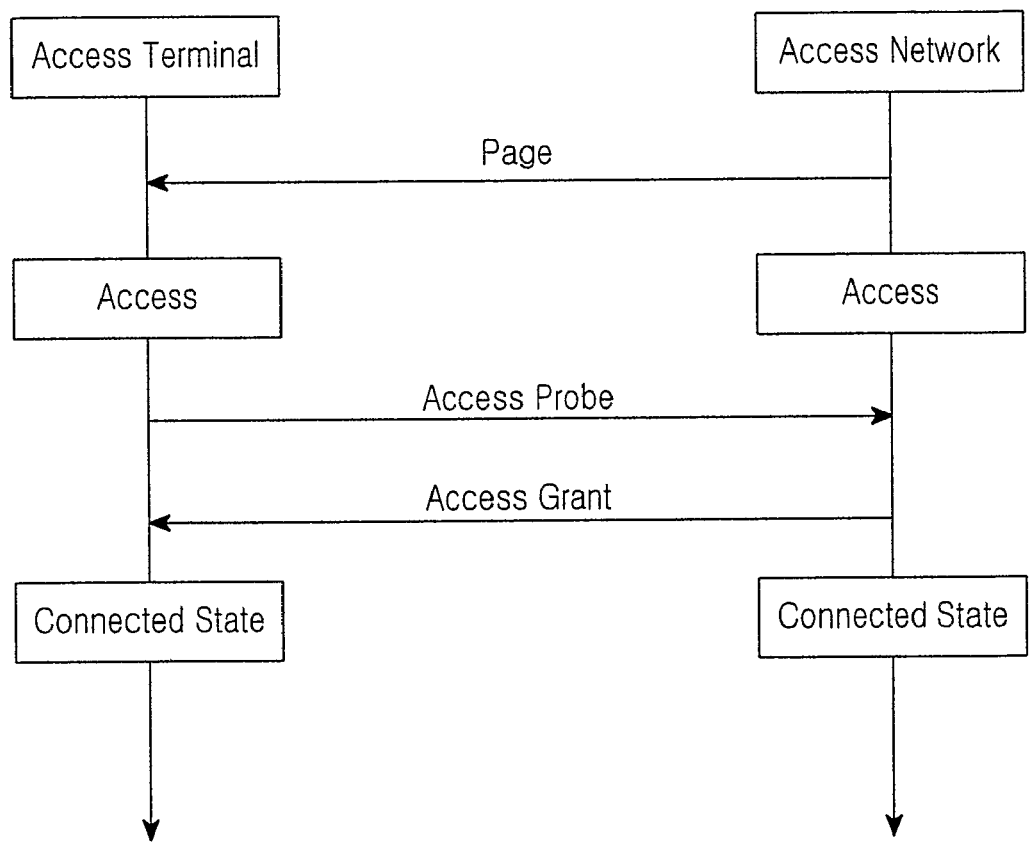
FIG. 2 indicates Proposed Connection Setup Procedure-1 for MT Call

In the present invention reduced connection, setup time is possible by reserving some of the Access Sequences, and using them only to send in page message along with full unique ATI. These reserved Access Sequences will be used by AN to direct the paged ATs to do the access attempt by using this access sequence and hence there is no question of collision during access attempts. AT uses this Access Sequence to send access probe in the form of preamble. Since AN knows that which Access Sequence is assigned to which AT, when the access probe with this access sequence is received by AN, access probe can directly be treated as ConnectionOpenRequest message. AN sends the AG message in response to access. Upon reception of AG message, AT stops Access attempts. AG message can be considered as ConnectionOpenResponse. Bind request/response message exchanges can be avoided as AT and AN knows information related to unique ATI, MAC ID, Access Sequence etc. FIG. 2 shows message exchanges during this case, if it is required to send Bind Request/Response (and hence Connection Request/Response) then also sending reserved access sequence in the page message has many advantages, e.g. reduced overall collision probability, reduced access probe detection threshold at AN (this is because AN knows it has sent a page message with a particular access sequence so it is waiting for that specific access sequence hence making the detection of the probe more probable.

Some times it is desirable to send page messages to many ATs simultaneously in a single page packet. In this type of scenario, the proposed mechanism i.e. reserving few access sequences out of available access sequences and sending one sequence per paged AT can still be applicable. Efficient usage of available bits is possible by sending one access sequence which can be called as base access sequence and it will be applicable for the first ATI in the page packet; rest of the paged ATs can derive their respective reserved access sequence by applying simple arithmetic of adding it's location in the page packet to the base access sequence number. Further optimization is possible in the form of indexing the reserved access sequence; in this way, instead of sending complete access sequence in the page packet one index can be sent which can be represented with less number of bits.

Figure 1:
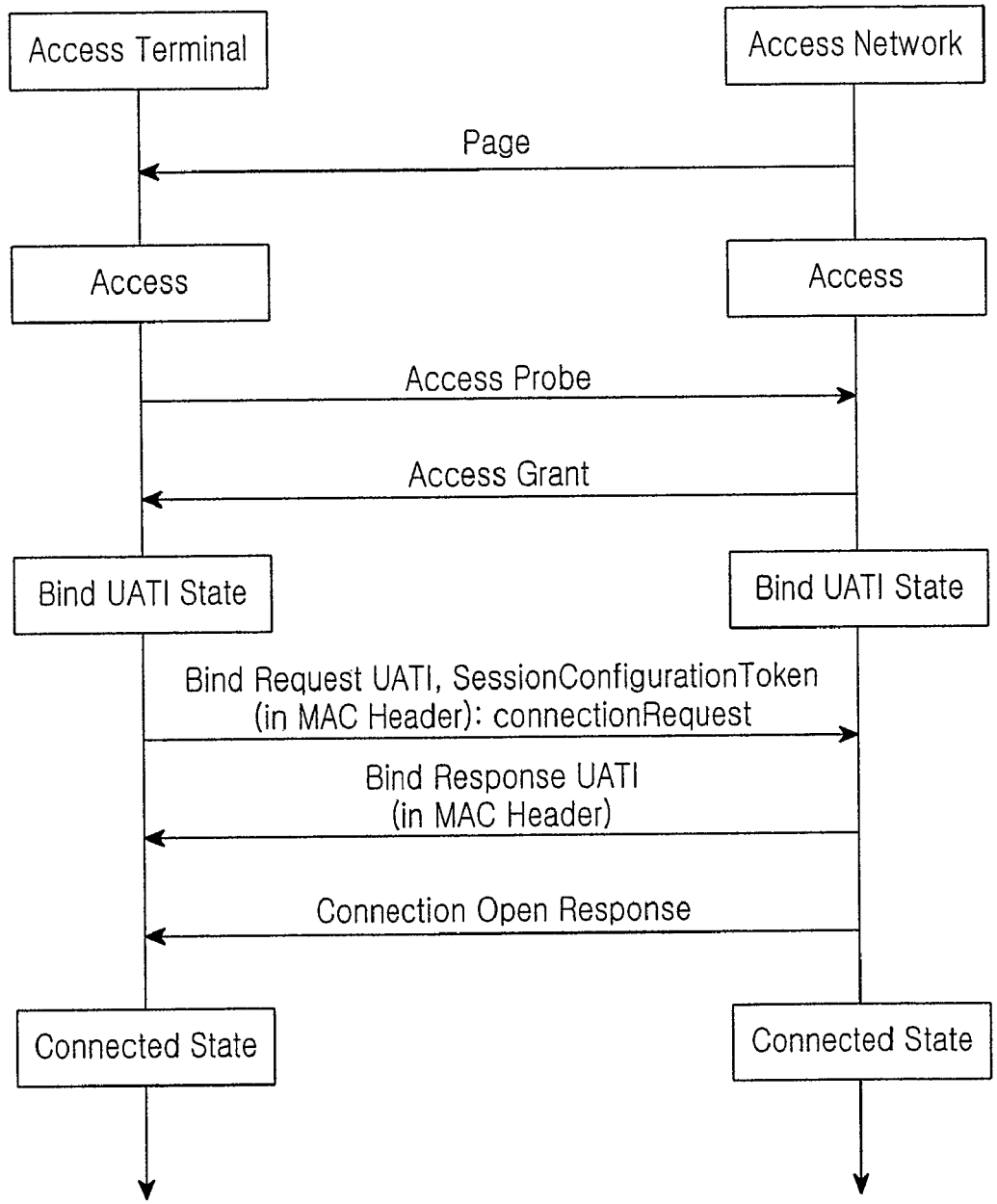
FIG. 1 indicates Current Connection Setup Procedure for MT Call

Though there is a possibility of fragmentation in the reserved access sequence pool, but this can be avoided by following call setup procedure as given in FIG. 1, plus reserved access sequence in the page message which is reserved for this AT only for certain duration (say 2 superframes). After this interval, AT will perform the access attempt by selecting one access sequence randomly from the non reserved access sequence pool.

Figure 3:
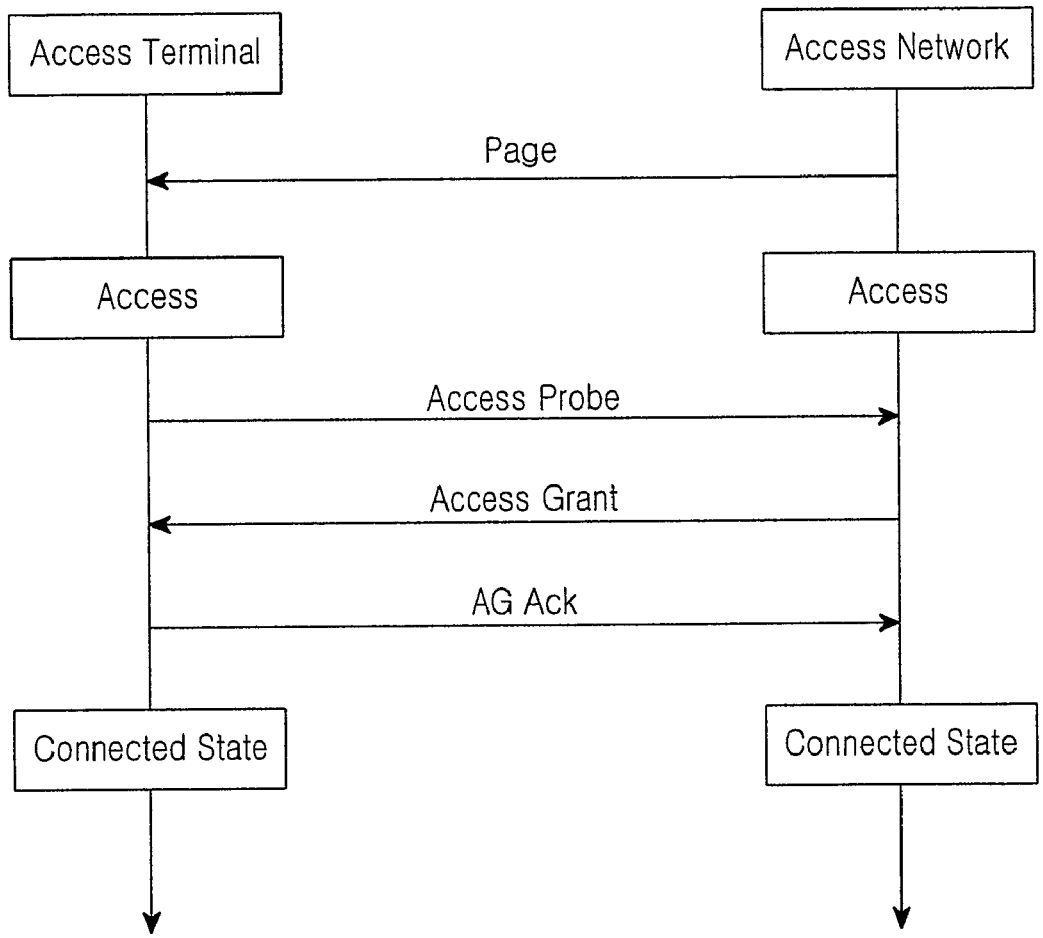
FIG. 3 indicates Proposed Connection Setup Procedure-2 for MT Call

In another embodiment as shown in FIG. 3, all the steps as shown in FIG. 2 are followed by an acknowledgement for AG message by AT. This ensures that AG message is received by AT.

Figure 4:
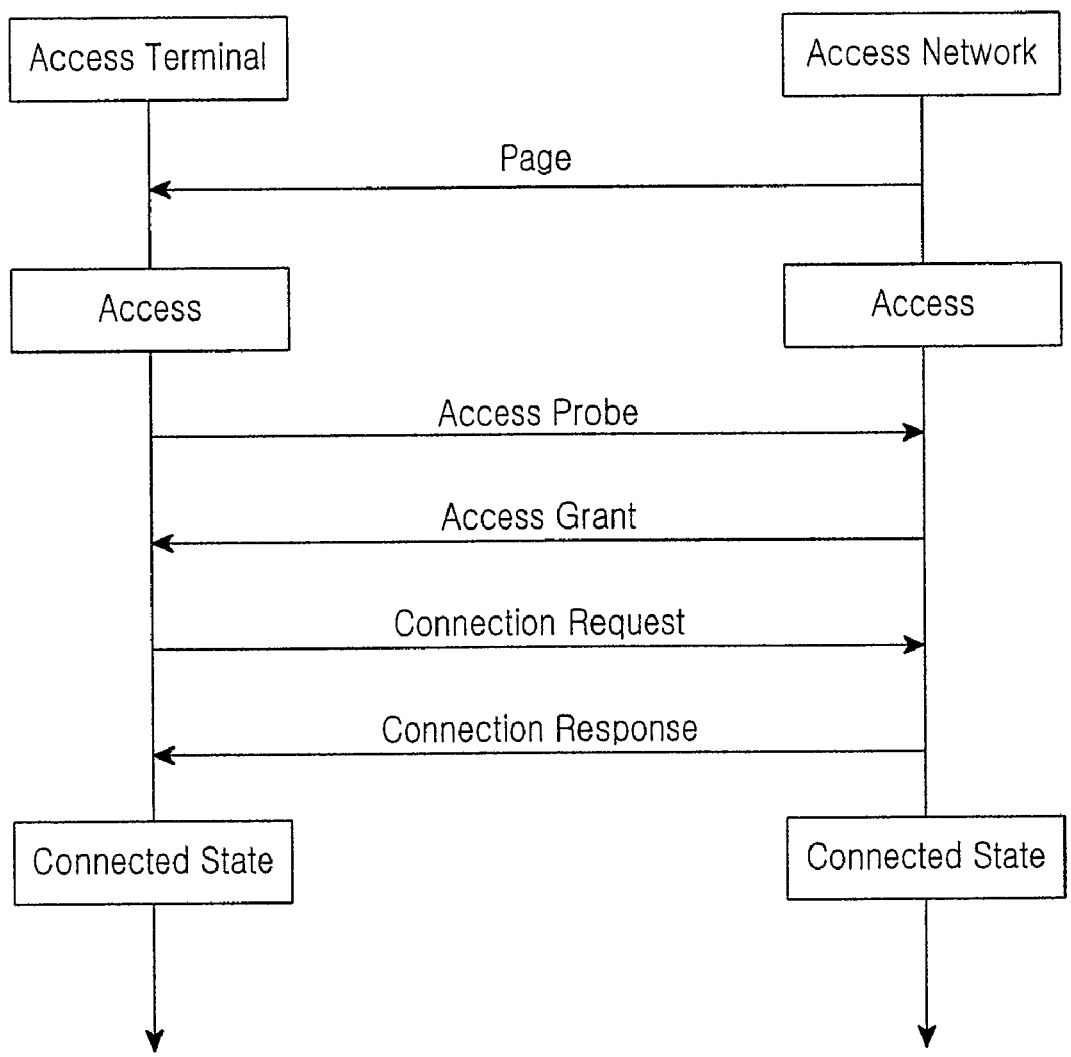
FIG. 4 indicates Proposed Connection Setup Procedure-3 for MT Call

In yet another embodiment as shown in FIG. 4, all the steps as shown in FIG. 2 are followed by ConnectionOpen Request/Response. In this case preamble is not treated as ConnectionOpenRequest, and AG message is not treated as ConnectionOpenResponse.

Figure 5:
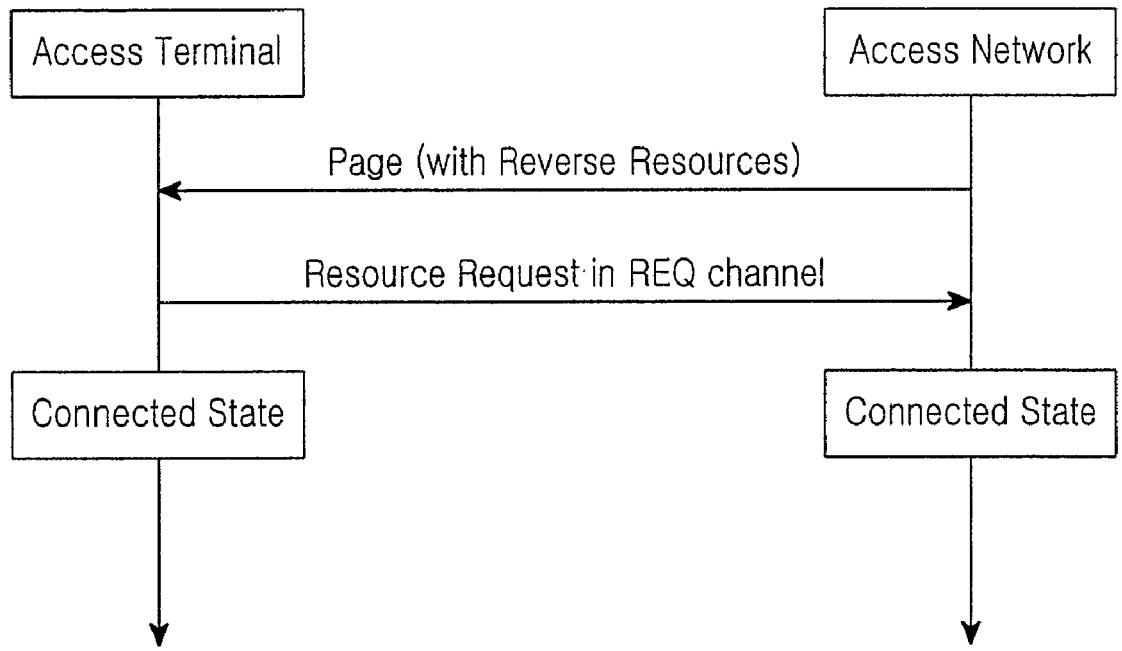
FIG. 5 indicates Proposed Connection Setup Procedure-4 for MT Call

In yet another embodiment as shown in FIG. 5, reverse resource allocation is sent along with page which can directly be utilized to request further resources from AN. This approach can even remove the need for sending Access Probe and Access Grant exchange hence reduces the connection setup time to a good extent. The disadvantage associated with this embodiment is time and power estimation in both AT and AN. Access Probe and AG message are used to estimate time difference between AT and AN, also AT gets the estimation for power required to transmit on the reverse direction. If power and time estimates are available then this mechanism is the best one to be used. Also, this method is very useful when AN has a good estimate of AT's location at sector level.

ADVANTAGES

The advantages of the invention are:
1. The connection setup time is reduced
2. There is no collision during Access Attempts Although, the present invention has been fully described in connection with the preferred embodiments thereof with reference to the accompanying drawings, it is to be noted that various changes and modifications are possible and are apparent to those skilled in the art. Such changes and modifications are to be understood as included within the scope of the present invention as defined by the appended claims unless they depart there from.

GLOSSARY OF TERMS AND DEFINITIONS THEREOF

AN: Access Network
AT: Access Terminal
ATI: Access Terminal Identifier
UATI: Universal Access Terminal Identifier
AG: Access Grant message
MT: Mobile Terminated

What is claimed is:

1. A method for efficient connection setup procedure for mobile terminated calls comprising the steps of:
   reserving Access Sequences (ASs), by an Access Network (AN), and sending a page message along with a full unique Access Terminal Identifier (ATI) to an Access Terminal (AT) by using the reserved ASs;
   directing, by the AN, paged Access Terminals (ATs) to perform a network access attempt by using one of the reserved ASs;
   sending, by the AT, an access probe message of the AN in the form of a preamble using one of the reserved ASs;
   treating, by the AN, the access probe message as a ConnectionOpenRequest message when the access probe message with the one of the reserved ASs is received;
   sending, by the AN, Access Grant (AG) message in response to the access probe message; and
   stopping, by the AT, the network access attempt upon reception of the AG message by considering the AG message as a ConnectionOpenResponse.

2. A method as claimed in claim 1 wherein overall collision probability and access probe detection threshold at the AN is reduced by sending the reserved AS in the page message.

3. A method as claimed in claim 1 wherein the page messages is adapted to be send to many ATs simultaneously in a single page packet.

4. A method as claimed in claim 1 wherein usage of available bits is performed by sending one access sequence which is applicable for a first ATI in a page paging packet; rest of the paged ATs deriving their respective reserved AS by applying simple arithmetic of adding its location in the paging packet to the base access sequence number.

5. A method as claimed in claim 1 wherein optimization is performed by
   indexing the reserved AS.

6. A method as claimed in claim 1 wherein the AT is adapted to make an acknowledgement for the AG message.

7. A method as claimed in claim 1 wherein reverse resource allocation is sent along with the page message which is utilized to request further resources from the AN.

8. A system for efficient connection setup procedure for mobile terminated calls comprising:
   an Access Network (AN) for reserving Access Sequences (ASs), and sending a page message along with a full unique Access Terminal Identifier (ATI) to an Access Terminal (AT) by using the reserved ASs, and
   for directing paged Access Terminals (ATs) to perform a network access attempt by using one of the reserved ASs, and for treating the access probe message as a ConnectionOpenRequest message when the access probe message with the one of the reserved ASs is received, and for sending an Access Grant (AG) message in response to the access probe message;
   the AT for sending an access probe message to the AN in the form of a preamble using one of the reserved ASs, and
   for stopping the network access attempt upon receipt of the AG message by considering the AG message as a ConnectionOpenResponse.

* * * * *